(12) United States Patent
Nishiyama et al.

(10) Patent No.: US 12,182,589 B2
(45) Date of Patent: Dec. 31, 2024

(54) INFORMATION PROCESSING APPARATUS AND CONTROL METHOD

(71) Applicant: Lenovo (Singapore) Pte. Ltd., Singapore (SG)

(72) Inventors: Masaru Nishiyama, Kanagawa (JP); Wah Tung Jimmy Wan, Kanagawa (JP); Kyoko Kawamura, Kanagawa (JP); Yoshinori Ito, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 84 days.

(21) Appl. No.: 18/157,080

(22) Filed: Jan. 20, 2023

(65) Prior Publication Data

US 2023/0251875 A1    Aug. 10, 2023

(30) Foreign Application Priority Data

Feb. 4, 2022   (JP) .................................. 2022-016329

(51) Int. Cl.
*G06F 9/44*    (2018.01)
*G06F 9/445*   (2018.01)
*G06F 9/54*    (2006.01)

(52) U.S. Cl.
CPC .......... *G06F 9/44505* (2013.01); *G06F 9/542* (2013.01)

(58) Field of Classification Search
CPC .................................................. G06F 9/44505
See application file for complete search history.

(56) References Cited

FOREIGN PATENT DOCUMENTS

| JP | 2009-037441 A | 2/2009 |
| JP | 2018-011211 A | 1/2018 |
| JP | 2018-196010 A | 12/2018 |

*Primary Examiner* — Stefan Stoynov
(74) *Attorney, Agent, or Firm* — Osha Bergman Watanabe & Burton LLP (57) ABSTRACT

An information processing apparatus includes: a memory that temporarily stores a program of operating system (OS); and a processor capable of supplying imaging data captured by an imaging unit based on the program of OS to only one of applications running on the OS, and of performing image processing on the imaging data based on an image processing program running on the OS. The processor is configured to when the imaging data is supplied to a first application, pass setting parameters used for the image processing from a second application other than the first application to the image processing via a registry of the OS.

6 Claims, 7 Drawing Sheets

INFORMATION PROCESSING APPARATUS AND CONTROL METHOD

CROSS-REFERENCE TO RELATED APPLICATIONS

This application claims priority to Japanese Patent Application No. 2022-16329 filed on Feb. 4, 2022, the contents of which are hereby incorporated herein by reference in their entirety.

TECHNICAL FIELD

The present invention relates to an information processing apparatus and a control method.

BACKGROUND

Information processing apparatuses such as personal computers typically are equipped with a camera function (see Japanese Unexamined Patent Application Publication No. 2018-196010, for example). This camera function is for many purposes, such as taking still and moving images, video conferencing, person detection, and user authentication.

However, due to operating system (OS) restrictions, an access to the camera functions from applications running on the OS may be exclusive. In that case, when one of the applications is using the camera functions, other applications are unable to access the camera functions. For instance, if a user tries to adjust the image displayed on the application using the camera from another application to improve the image quality, the camera functions are occupied by the application in use. The other application therefore fails to access to the camera functions.

SUMMARY

One or more embodiments of the present invention provide an information processing apparatus and a control method capable of appropriately controlling an access to camera functions from a plurality of applications.

In one or more embodiments, an information processing apparatus includes: a memory that temporarily stores a program of operating system (OS); and a processor capable of supplying imaging data captured by an imaging unit based on the program of OS to only one of applications running on the OS, and of performing image processing on the imaging data based on an image processing program running on the OS. The processor is configured to, when the imaging data is supplied to a first application, pass setting parameters used for the image processing from a second application other than the first application to the image processing via a registry of the OS.

In the information processing apparatus, the processor may be configured to, when the imaging data is supplied to the second application, pass the setting parameters from the second application to the image processing not via the registry.

In the information processing apparatus, the processor may be configured to set the setting parameters output from the second application to the registry via a service, which changes settings of the registry, and then read the setting parameters set in the registry to pass the parameters to the image processing.

In the information processing apparatus, the setting parameters may be to adjust image quality of the imaging data.

In the information processing apparatus, the processor may be configured to, when the imaging data is supplied to the first application, pass setting parameters related to imaging conditions for the imaging unit from the second application to the imaging unit via the registry.

A control method according to one or more embodiments is for an information processing apparatus including: a memory that temporarily stores a program of operating system (OS); and a processor capable of supplying imaging data captured by an imaging unit based on the program of OS to only one of applications running on the OS, and of performing image processing on the imaging data based on an image processing program running on the OS. The method includes: a step where the processor passes setting parameters used for the image processing from a second application other than a first application to the image processing via a registry of the OS; a step where the processor performs image processing on the imaging data based on the setting parameters; and a step where the processor supplies imaging data subjected to the imaging processing to the first application.

The above-described aspects of the present invention appropriately control an access to camera functions from multiple applications.

DETAILED DESCRIPTION

The following describes embodiments of the present invention, with reference to the drawings.

Figure 1:
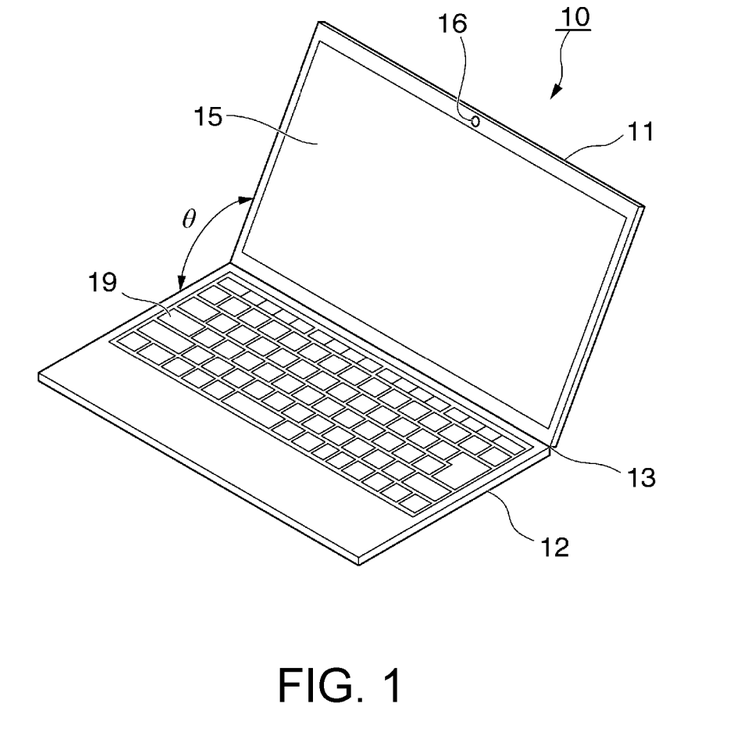
FIG. 1 is a perspective view illustrating the appearance of an information processing apparatus according to one or more embodiments.

FIG. 1 is a perspective view illustrating the appearance of an information processing apparatus according to one or more embodiments. The information processing apparatus 10 in the drawing is a clamshell type laptop personal computer (PC). The information processing apparatus 10 includes a first chassis 11, a second chassis 12 and a hinge mechanism 13. The first chassis 11 and the second chassis 12 are substantially quadrangular plate-shaped (e.g., flat plate-shaped) chassis. One of the side faces of the first chassis 11 and one of the side faces of the second chassis 12 are joined (connected) via the hinge mechanism 13, and the first chassis 11 and the second chassis 12 are relatively rotatable around the rotary shaft of the hinge mechanism 13. When the opening angle θ between the first chassis 11 and the second chassis 12 around the rotary shaft is approximately 0°, the first chassis 11 and the second chassis 12 overlap to be closed (called "closed state"). The surfaces of the first chassis 11 and the second chassis 12 facing each other in the closed state are referred to as their "inner surfaces", and the surfaces opposite to the inner surfaces are referred to as "outer surfaces". The opening angle θ can also be referred to as the angle between the inner surface of the first chassis 11 and the inner surface of the second chassis 12. As opposed to the closed state, when the first chassis 11 and the second chassis 12 are open, this posture is referred to as an "open state". In this open state, the first chassis 11 and the second chassis 12 are relatively rotated until the opening angle θ becomes larger than a preset threshold (e.g., 100).

The inner surface of the first chassis 11 has a display unit 15. The display unit 15 displays images based on the processing executed by the information processing apparatus 10. The first chassis 11 has an area on the inner surface surrounding the display unit 15, in which a camera 16 (one example of an imaging unit) is placed. That is, the camera 16 is placed at a position facing the user using the information processing apparatus 10.

The inner surface of the second chassis 12 has a keyboard that is an input unit 19. In the closed state, the user cannot view the display unit 15 and does not operate the keyboard. In the open state, the user views the display unit 15 and operates the keyboard (i.e., the information processing apparatus 10 is operable).

The information processing apparatus 10 executes operating system (OS) programs and applications (application programs) that run on the OS to implement different types of functions. For instance, the information processing apparatus 10 executes an application program that uses the functions of the camera 16 to implement the processing using the imaging data captured by the camera 16.

(Hardware Configuration of Information Processing Apparatus 10)

Figure 2:
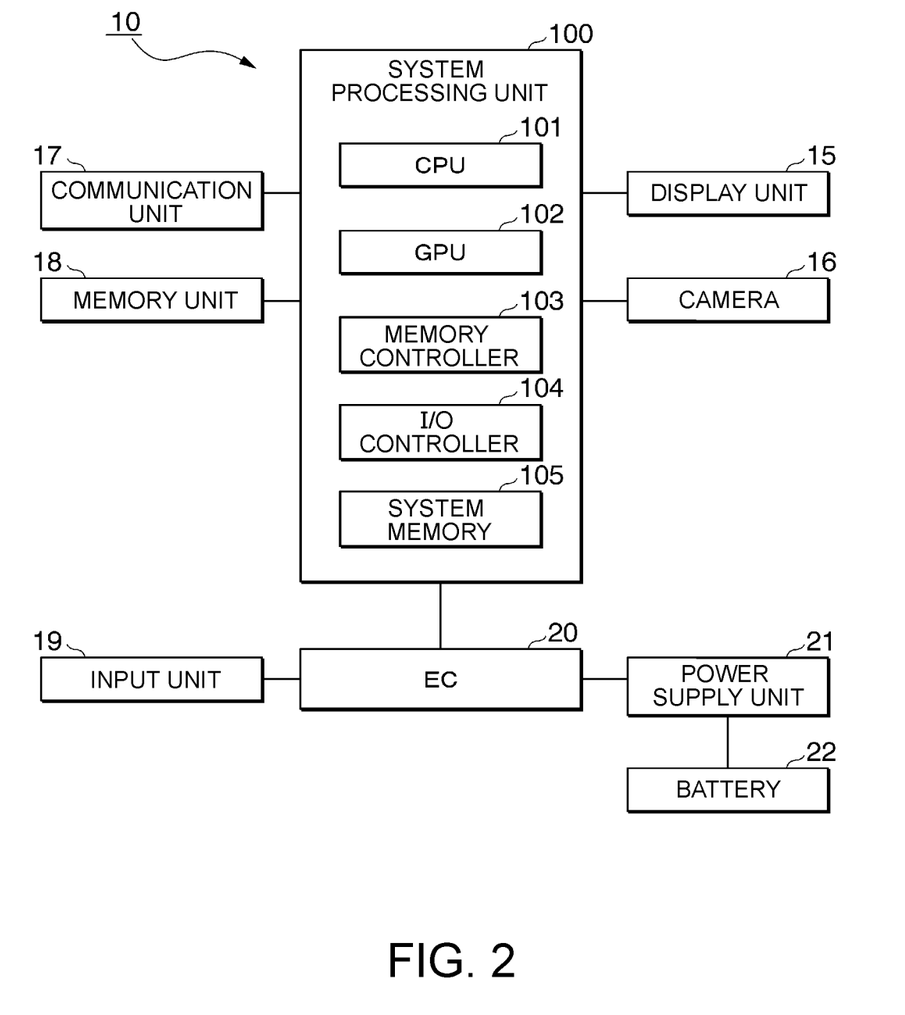
FIG. 2 is a block diagram illustrating one example of the hardware configuration of the information processing apparatus according to one or more embodiments.

FIG. 2 is a block diagram illustrating one example of the hardware configuration of the information processing apparatus 10 according to one or more embodiments. In this drawing, like numerals indicate like parts in FIG. 1. The information processing apparatus 10 in the drawing includes the display unit 15, the camera 16, a communication unit 17, a memory unit 18, the input unit 19, an embedded controller (EC) 20, a power supply unit 21, a battery 22, and a system processing unit 100.

The display unit 15 includes a display device, such as a liquid crystal display (LCD) or an organic electro luminescence (EL) display. The display unit 15 displays images based on the display data under the control by the system processing unit 100. The display data includes the image and character data generated through the processing of the OS or applications running on the OS. For instance, the display unit 15 displays images based on imaging data captured by the camera 16 in accordance with the processing of an application, and images based on the imaging data subjected to image processing.

The camera 16 includes lenses and an image pickup element, which are not illustrated, and captures a subject image input through the lenses and converts the image into imaging data that is an electrical signal for outputting. For instance, the camera 16 images a predetermined range (angle of view) in the direction facing the inner surface of the first chassis 11 at predetermined time intervals, and outputs the captured imaging data to the system processing unit 100. The predetermined time intervals correspond to, for example, the frame rate of the imaging data.

The communication unit 17 is communicatively connected to other devices via a wireless or wired communication network to transmit and receive various types of data. For instance, the communication unit 17 includes a wired LAN interface such as Ethernet (registered trademark) or a wireless LAN interface such as Wi-Fi (registered trademark).

The memory unit 18 includes storage media such as hard disk drive (HDD), solid state drive (SSD), random access memory (RAM), and read only memory (ROM). For instance, the memory unit 18 stores programs such as OS, various types of drivers, various types of services/utilities, and applications, as well as various types of data.

The input unit 19 accepts user's input, and includes a keyboard as illustrated in FIG. 1, for example. The input unit 19 accepts user's operation to the keyboard and accordingly outputs an operation signal in accordance with the user's operation to the EC 20. The input unit 19 may include a touch panel, a touch pad, etc. instead of or in addition to the keyboard. The input unit 19 may be wired or wirelessly connected to an external operation device, such as a mouse or external keyboard, and may accept user's operation to the connected external operation device.

The EC 20 is a one-chip microcomputer to monitor and control various devices (e.g., peripherals and sensors), irrespective of the system state of the OS. The EC 20 includes a central processing unit (CPU), a RAM, and a ROM, which are not illustrated, as well as A/D input terminals for multiple channels, D/A output terminals, timers, digital input/output terminals, and the like. The EC 20 is connected to the input unit 19, and the power supply unit 21, etc., via these input/output terminals. The EC 20 receives or transmits various signals with each of the connected units.

For instance, the EC 20 acquires operation signals output from the input unit 19 and executes processing based on the acquired operation signals. The EC 20 outputs the acquired operation signals that are related to the processing of the system processing unit 100 to the system processing unit 100. The EC 20 also controls the power supply unit 21 in accordance with the OS system state and other factors. For instance, the EC 20 outputs control signals to the power supply unit 21 to control the supply of power in accordance with the system state and other factors. The EC 20 also communicates with the power supply unit 21 to obtain information on the state of the battery 22 (e.g., remaining capacity) from the power supply unit 21.

The power supply unit 21 includes a DC/DC converter and a charge-discharge circuit to control charging or discharging of the battery 22. The power supply unit 21 converts DC power supplied from the battery 22 or from a not-illustrated external power source (e.g., AC adapter) into multiple voltages required to operate various parts of the information processing apparatus 10. The power supply unit 21 supplies power to the various parts of the information processing apparatus 10 under the control of the EC 20.

The battery 22 is a secondary battery that supplies power to various parts of the information processing apparatus 10 when power is not supplied from an external power source (e.g., AC adapter). When power is supplied from an external power supply (e.g., AC adapter), the battery 22 is charged with the power through the power supply unit 21 until it is fully charged. When power is not supplied from an external power source (e.g., AC adapter), the power charged in the battery 22 is discharged and supplied to various parts of information processing apparatus 10 via the power supply unit 21.

The system processing unit 100 includes a CPU 101, a graphic processing unit (GPU) 102, a memory controller 103, an input-output (I/O) controller 104, and a system memory 105. The CPU 101 and GPU 102 may be collectively called processors.

The CPU 101 executes processing by programs such as OS, various drivers, various services/utilities, and applications. For the OS, Windows (registered trademark) may be used as an example. The GPU 102 is connected to the display unit 15. The GPU 102 executes image processing under the control of the CPU 101 to generate display data. The GPU 102 outputs the generated display data to the display unit 15. The CPU 101 and GPU 102 may be integrated to be a single core, or the load may be shared between the CPU 101 and the GPU 102 that may be individual cores. The number of the processors is not limited to one, but may be multiple.

The memory controller 103 controls the reading and writing of data from the system memory 105 and the memory unit 360, for example, during the processing by the CPU 101 and GPU 102.

The I/O controller 104 controls the data input/output with the display unit 15, the camera 16, the communication unit 17, the EC 20, and the like.

The system memory 105 is a writable memory functioning as a read-in area of a program executed by the processor such as the CPU 101 or the GPU 102 or as a work area to write the data processed by the program. For instance, the system memory 105 includes a plurality of dynamic random access memory (DRAM) chips. The program includes an OS, various types of drivers to operate peripherals, various types of service/utility and applications.

(Configuration of Camera-Function Control Processing)

Next, the following describes a control in the information processing apparatus 10 when a plurality of applications use the functions of the camera 16. Due to OS restrictions, for example, when one application uses the functions of the camera 16, the application occupies the functions of the camera 16, and other applications are not allowed to access the functions of the camera 16. For instance, assume the case where a user already executes an application (camera app) to capture images using the camera 16. In that case, if the user executes another application (image-quality adjustment app) to enhance the image quality of the imaging data captured by the camera 16, this application (image-quality adjustment app) will fail to directly access the functions of the camera 16.

Figure 3:
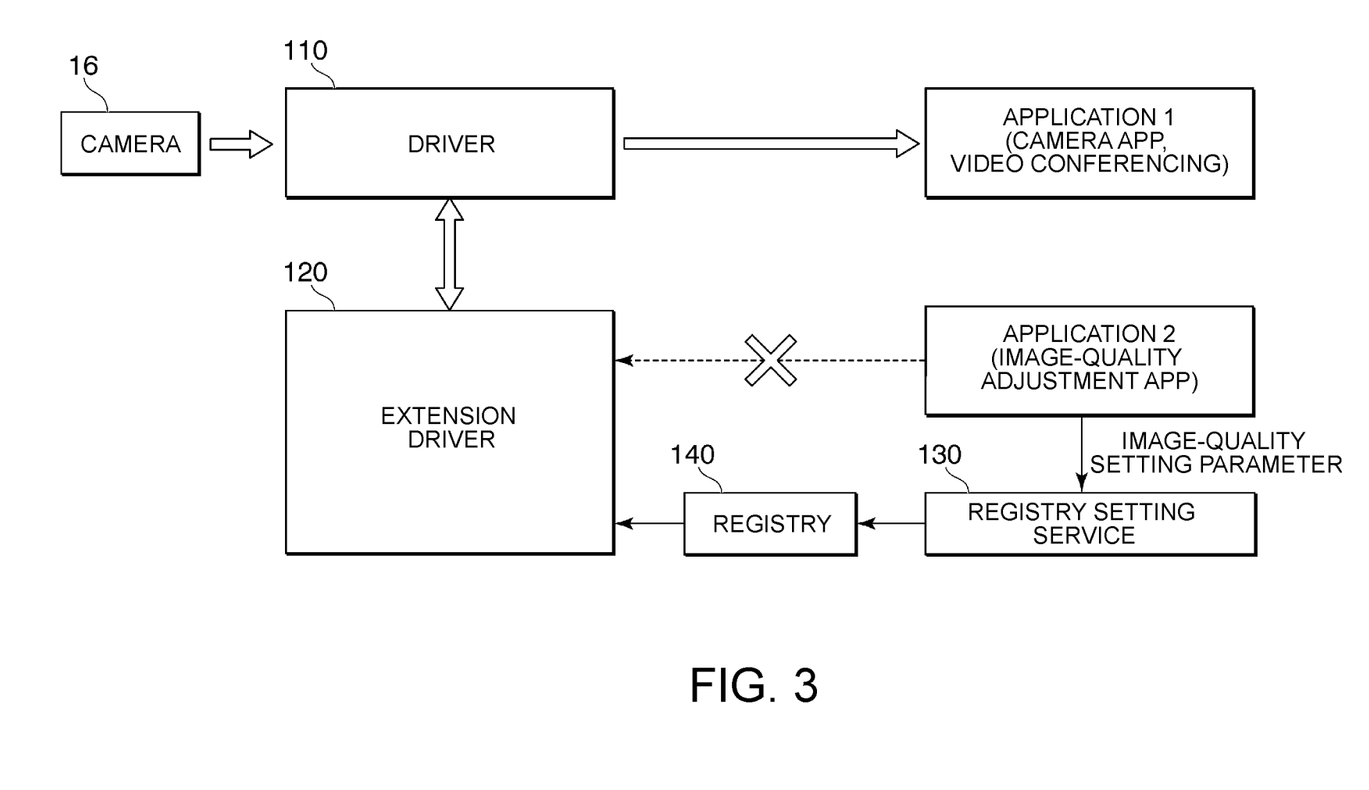
FIG. 3 is a block diagram illustrating one example of the configuration of camera-function control processing according to one or more embodiments.

Then, the information processing apparatus 10 of one or more embodiments is configured so that the application executed later passes image-quality setting parameters to the functions of the camera 16 via a registry of the OS, thus adjusting the image quality of the imaging data captured by the camera 16. Referring to FIG. 3, the following describes this configuration in details.

FIG. 3 is a block diagram illustrating one example of the configuration of camera-function control processing according to one or more embodiments. In this drawing, a driver 110, an extension driver 120, a registry setting service 130, and a registry 140 are functional configurations implemented when the CPU 11 executes the OS or software supported as functions of the OS.

The driver 110 is a driver for the camera 16. The imaging data captured by the camera 16 can be used by applications via the driver 110. The imaging data output from the driver 110 can be used by only a single application. The extension driver 120 allows other applications to access the functions of the camera 16 and perform image processing on the imaging data.

Application 1 illustrated in the drawing is an application (camera app) that uses the camera 16 to capture images, or an application (video conference app) that uses the imaging data for video conferencing. The application 1 acquires the imaging data captured by the camera 16 via the driver 110 and displays an image (camera image) based on the acquired imaging data.

Figure 4:
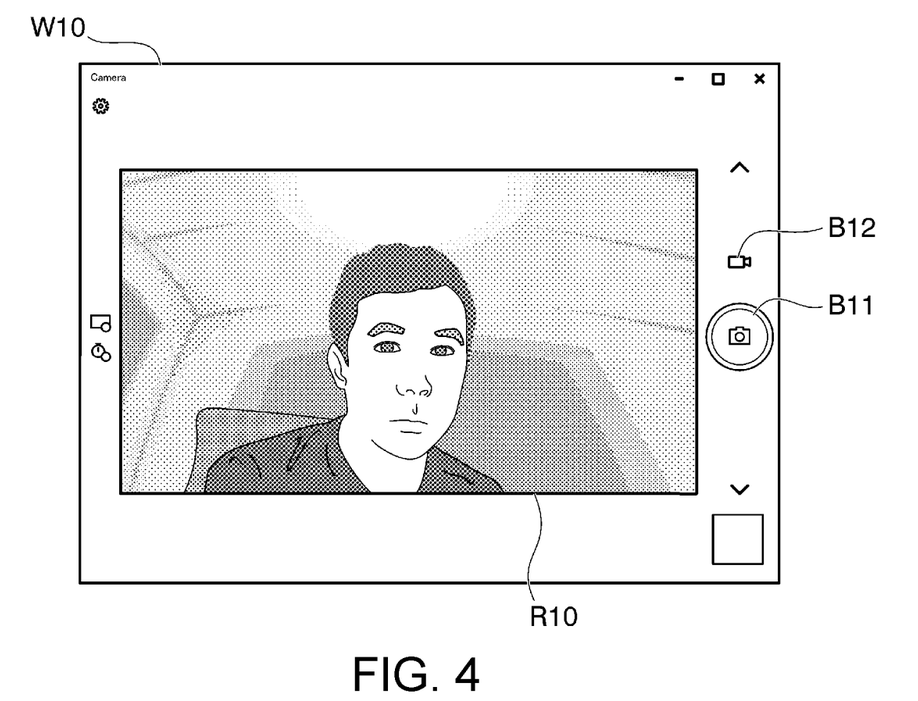
FIG. 4 illustrates a display example of application 1 according to one or more embodiments.

FIG. 4 illustrates a display example of the application 1 according to one or more embodiments. A window W10 in the drawing is a display example of the window in the application 1 displayed on the display unit 15. The window W10 has a camera-image display region R10, on which an image (camera image) based on the imaging data captured by the camera 16 is displayed. On the right of the camera-image display region R10, the window W10 displays a still-image shooting button B11 operated by the user when shooting a still image, a moving image shooting button B12 operated when shooting a moving image, and the like.

Application 2 illustrated in FIG. 3 is an application (image-quality adjustment app) to adjust the image quality of the imaging data captured by the camera 16.

Figure 5:
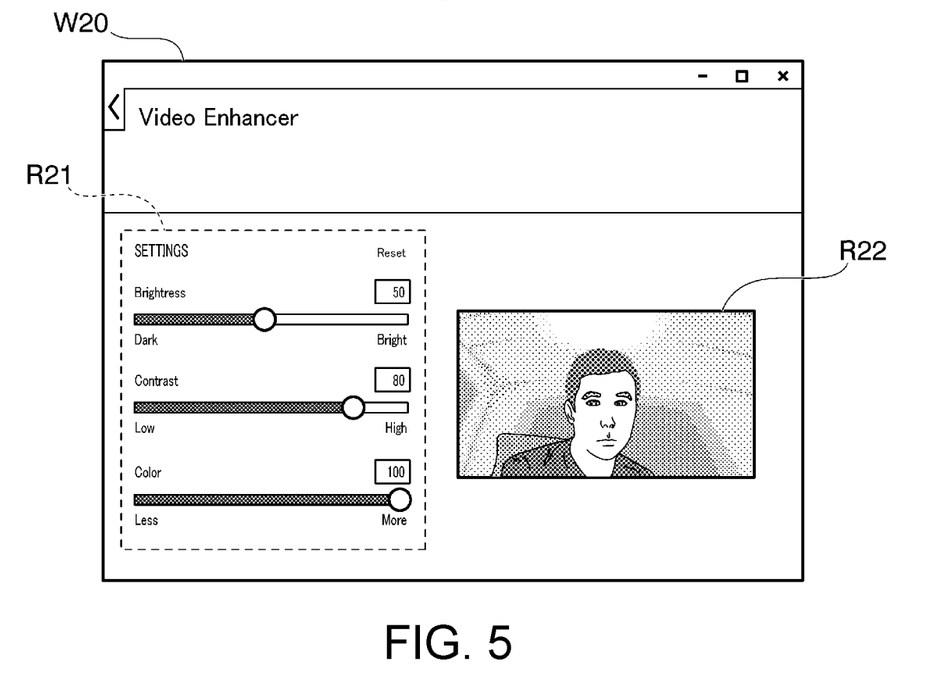
FIG. 5 illustrates a display example of application 2 according to one embodiment.

FIG. 5 illustrates a display example of the application 2 according to one or more embodiments. A window W20 in the drawing is a display example of the window in the application 2 displayed on the display unit 15. The window W20 has an image-quality setting region R21, on which an operation user interface (UI) is displayed for adjusting the image quality of the imaging data. For instance, the user can perform operations to adjust the brightness, the contrast, and the color. In response to the user's operation on this image-quality setting region R21, the application 2 outputs image-quality setting parameters indicating set values for brightness, contrast, color, etc.

The window W20 has another region that is a camera-image display region R22, on which an image (camera image) based on the imaging data captured by the camera 16 is displayed. When the application 2 is executed later while the application 1 is being executed, no camera image will be displayed in the camera-image display region R22 of the application 2 because the application 1 is using the imaging data. Note that when the application 2 is executed before the application 1, the application 2 is allowed to use the functions of the camera 16, and thus the camera image is displayed in the camera-image display region R22.

Referring back to FIG. 3, this drawing illustrates the application 1 running before the application 2 and using the functions of the camera 16. The extension driver 120 acquires imaging data from the camera 16 via the driver 110, performs image processing to the acquired imaging data based on the image-quality setting parameters output from the application 2, and outputs the imaging data to the application 1.

Note here that the functions of the camera 16 are occupied by application 1, meaning that the application 2, which is executed later and outputs the image-quality setting parameters, fails to directly send the parameters to the extension driver 120. The application 2 therefore outputs the image-quality setting parameters to the registry setting service 130. Receiving the image-quality setting parameters from the application 2, the registry setting service 130 sets the acquired image-quality setting parameters in the registry 140. The extension driver 120 reads the image-quality setting parameters from the registry 140 and performs image processing on the imaging data based on the read image-quality setting parameters.

The extension driver 120 then supplies the imaging data subjected to the image processing to the application 1. The camera-image display region R10 in the window W10 of the application 1 illustrated in FIG. 4 displays an image (camera image) based on the imaging data subjected to the image processing.

This allows the information processing apparatus 10 to supply imaging data captured by the camera 16 to the application 1 when the application 1 is capturing images using the functions of the camera 16, and also to perform image processing on the imaging data based on the image-quality setting parameters output from the application 2 and supply the imaging data to the application 1.

Figure 6:
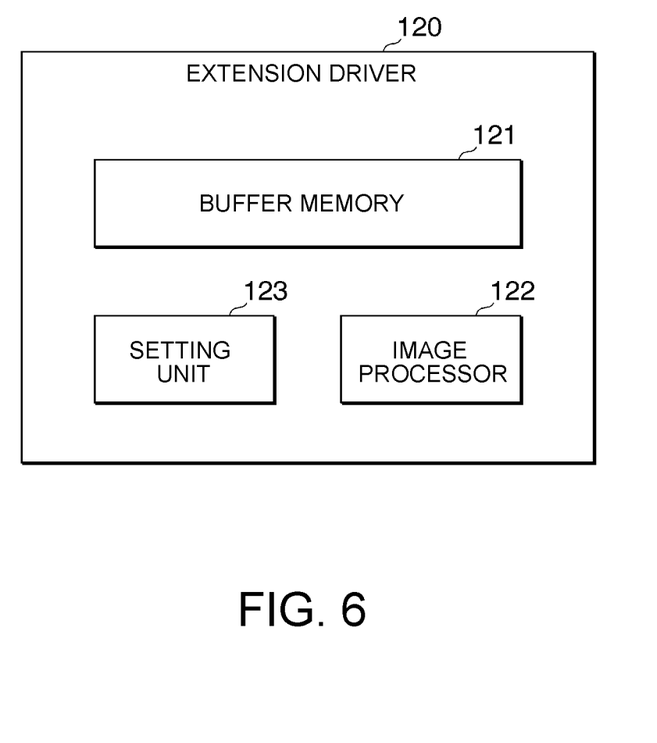
FIG. 6 is a block diagram illustrating an example of the configuration of an extension driver according to one or more embodiments.

Referring now to FIG. 6, the following describes the internal configuration of the extension driver 120.

FIG. 6 is a block diagram illustrating one example of the configuration of the extension driver 120 according to one or more embodiments. The extension driver 120 includes a buffer memory 121, a setting unit 122, and an image processor 123. The buffer memory 121 temporarily stores the imaging data output from the camera 16. The setting unit 122 sets image-quality parameters for image processing that the image processor 123 executes. For instance, the setting unit 122 reads image-quality setting parameters from the registry 140 and passes the read image-quality setting parameters to the image processor 123.

The image processor 123 performs image processing on the imaging data stored in the buffer memory 121 based on the image-quality setting parameters received from the setting unit 122. The image processor 123 then replaces the imaging data stored in the buffer memory 121 with the imaging data subjected to image processing. Note that the image processor 123 may be a function implemented by an image processing program developed and provided by a vendor that develops software.

The extension driver 120 reads the imaging data subjected to image processing, which is stored in the buffer memory 121, and supplies the imaging data to the application 1 via the driver 110. When no image processing is performed (i.e., image quality is not adjusted by the application 2), the extension driver 120 reads the unprocessed imaging data from the buffer memory 121 and supplies it to the application 1 via the driver 110. That is, depending on the processing by the application 2, the extension driver 120 may perform image processing on the imaging data output from the camera 16 before supplying it to application 1, or may supply the data to the application 1 without image processing.

For instance, the extension driver 120 may be a functional configuration designed using a device MFT supported as an extended function of Windows (registered trademark). For instance, the device MFT is executed in user mode as an extended function of the driver 110 that acquires imaging data of the camera 16. In contrast, the camera 16 and driver 110 run in kernel mode.

Figure 7:
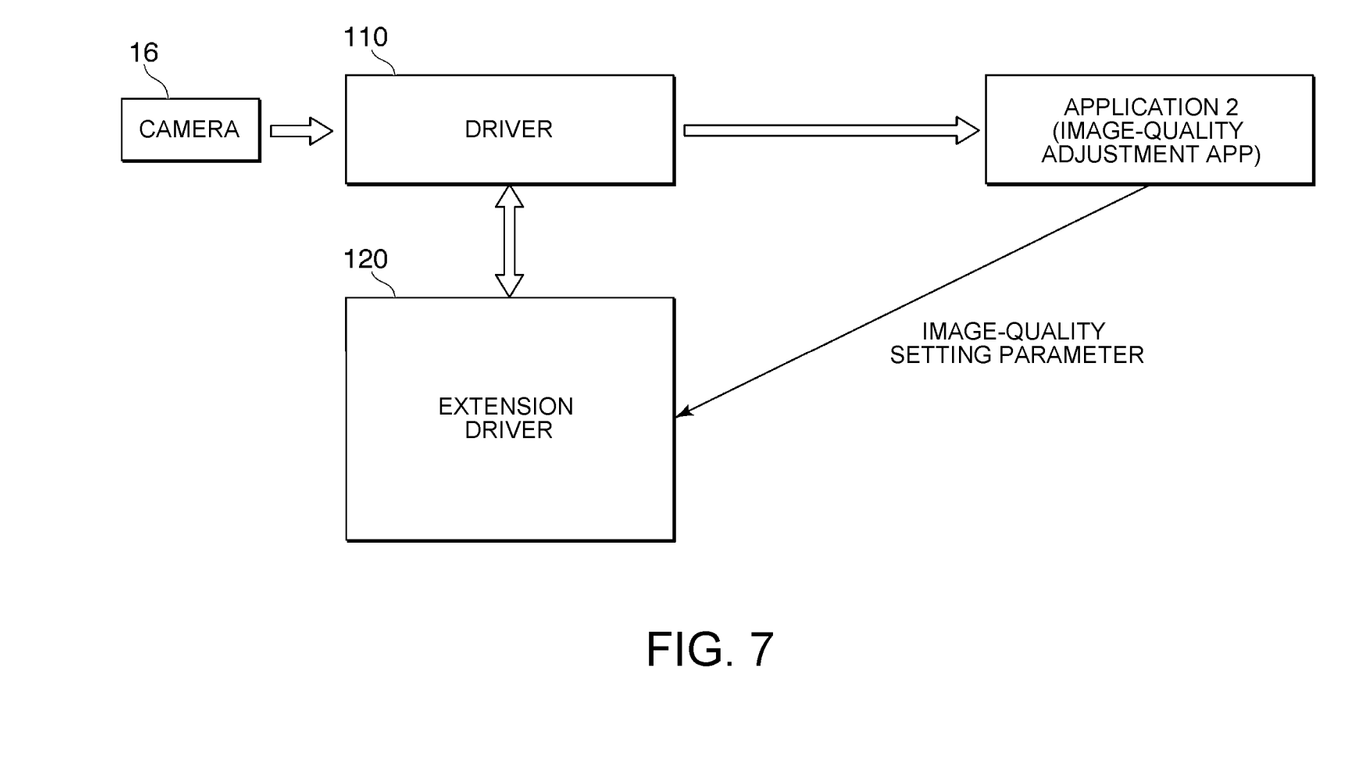
FIG. 7 is a block diagram illustrating another example of the configuration of camera-function control processing according to one or more embodiments.

That is the description for the case where the application 2 runs after the application 1 and image-quality setting parameters used for image processing on the imaging data by the camera 16 are applied via the registry. Meanwhile, when the application 2 runs before the application 1, the application 2 is allowed to use (occupy) the functions of the camera 16, meaning that the image-quality setting parameters can be applied not via the registry. FIG. 7 illustrates an overview of the camera-function control processing when the application 2 uses the functions of the camera 16.

FIG. 7 is a block diagram illustrating another example of the camera-function control processing according to one or more embodiments. In this drawing, like numerals indicate like parts in FIG. 3. This drawing illustrates no application other than the application 2 running that uses the functions of the camera 16, and the application 2 using the functions of the camera 16. In that case, the application 2 is allowed to send image-quality setting parameters directly to the extension driver 120. The extension driver 120 acquires the image-quality setting parameters from the application 2 and performs image processing on the imaging data based on the acquired image-quality setting parameters.

The extension driver 120 then supplies the imaging data subjected to the image processing to the application 2. The camera-image display region R22 in the window W20 of the application 2 illustrated in FIG. 5 displays an image (camera image) based on the imaging data subjected to the image processing.

This allows the information processing apparatus 10 to, when the application 2 is capturing images using the functions of the camera 16, perform image processing on the imaging data captured by the camera 16 based on the image-quality setting parameters output from the application 2 and supply the imaging data to the application 2.

Figure 8:
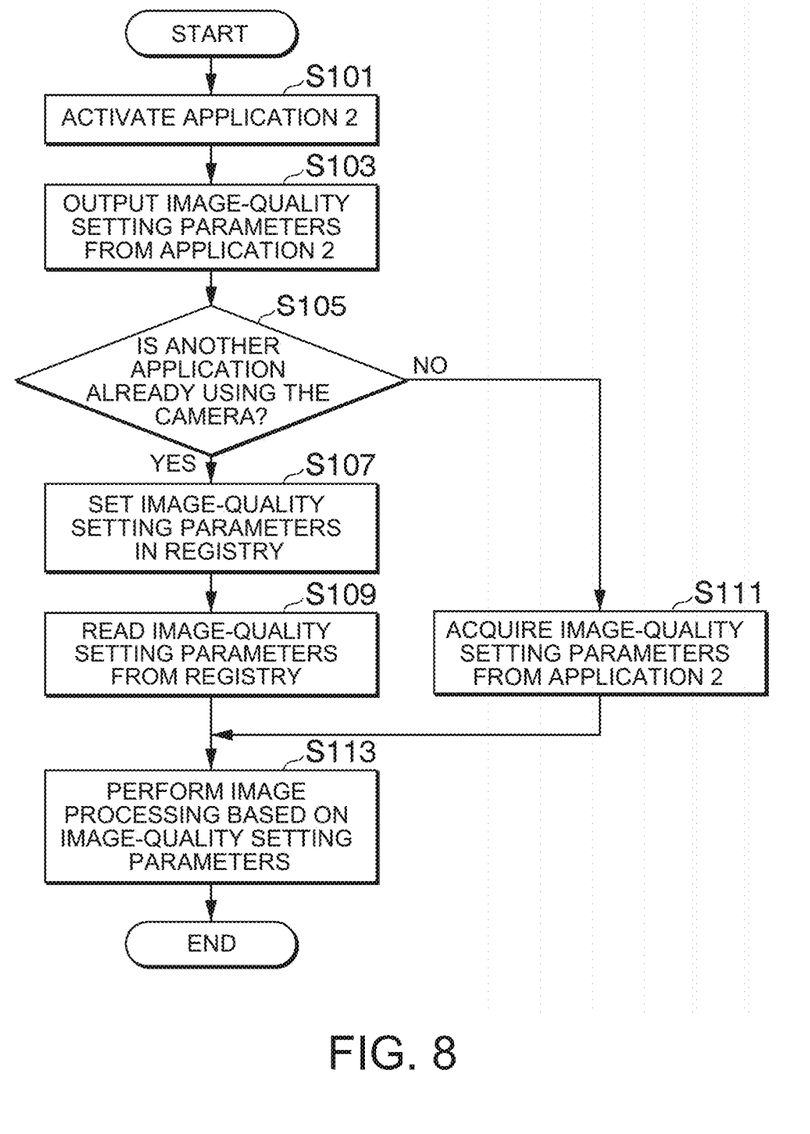
FIG. 8 is a flowchart of one example of the parameter transmission-route switching processing according to one or more embodiments.

Next, the following describes an operation of the parameter transmission-route switching processing, which changes the transmission route when sending image-quality setting parameters from the application 2 to the extension driver 120.

FIG. 8 is a flowchart of one example of the parameter transmission-route switching processing according to one or more embodiments.

The application 2 is activated by user's operation or the like (step S101). The application 2 outputs image-quality setting parameters in response to user's operation (operation on the image-quality setting region R21 in FIG. 5) (step S103).

If another application other than the application 2 is using the camera 16 (step S105: YES), the image-quality setting parameters output from the application 2 are set in the registry 140 via the registry setting service 130 (step S107). The extension driver 120 reads the image-quality setting parameters from the registry 140 (step S109).

If no application other than the application 2 is using the camera 16, that is, if the application 2 is using the camera 16 (step S105: NO), the extension driver 120 directly acquires the image-quality setting parameters output from the application 2 (step S111).

The extension driver 120 performs image processing on the imaging data based on the image-quality setting parameters read from the registry 140 in step S109 or the image-quality setting parameters acquired from the application 2 in step S111 (step S113).

As described above, the information processing apparatus 10 according to one or more embodiments includes: the system memory 105 (an example of a memory) that temporarily stores the OS program; and the CPU 11 (an example of a processor) that is capable of supplying imaging data captured by the camera 16 (an example of an imaging unit) based on the OS program to only one of the applications running on the OS, and of performing image processing on the imaging data based on the image processing program running on the OS. When the CPU 11 is supplying the imaging data to the application 1 (first application), the CPU 11 passes image-quality setting parameters (an example of setting parameters) used for image processing from the application 2 (second application) other than the application 1 to the image processing via the registry 140.

This allows the information processing apparatus 10 to pass the image-quality setting parameters used for image processing on the imaging data captured by the camera 16 from the application 2 other than the application 1 when the application 1 is capturing images using the functions of the camera 16, thus appropriately controlling an access to the camera functions from a plurality of applications.

For instance, the CPU 11 sets the image-quality setting parameters output from the application 2 to the registry 140 via the registry setting service 130 (an example of a service), which can change the settings of the registry 140, and then reads the image-quality setting parameters set in the registry 140 to pass the parameters to the image processing.

This allows the application 2 to act as an application without administrative privileges, where the application 2 does not directly access the registry 140.

The image-quality setting parameters adjust the image quality of the imaging data. For instance, the image-quality setting parameters include parameters for adjusting brightness, contrast, and color.

This allows the information processing apparatus 10 to, when the application 1 is capturing images using the functions of the camera 16, enhance the image quality of the imaging data captured by the camera 16 with the application 2 (e.g., image-quality adjustment app).

When the CPU 11 supplies the imaging data to the application 2, the CPU 11 passes the image-quality setting parameters from the application 2 to the image processing not via the registry 140.

This allows the information processing apparatus 10 to pass the image-quality setting parameters used for image processing on the imaging data captured by the camera 16 not via the registry 140 when the application 2 is using (occupying) the camera 16.

A control method of the information processing apparatus 10 according to one or more embodiments controls the information processing apparatus 10 that includes: the system memory 105 (an example of a memory) that temporarily stores the OS program; and the CPU 11 (an example of a processor) that is capable of supplying the imaging data captured by the camera 16 (an example of an imaging unit) based on the OS program to only one of the applications running on the OS, and of performing image processing on the imaging data based on the image processing program running on the OS. The method includes: a step where the CPU 11 passes image-quality setting parameters (an example of setting parameters) used for image processing from the application 2 (second application) other than the application 1 (first application) to image processing via the registry 140; a step where the CPU 11 executes image processing based on the image-quality setting parameters on the imaging data; and a step where the CPU 11 supplies the imaging data subjected to the image processing to the application 1.

This allows the information processing apparatus 10 to pass the image-quality setting parameters used for image processing on the imaging data captured by the camera 16 from the application 2 other than the application 1 when the application 1 is capturing images using the functions of the camera 16, and supply the imaging data subjected to image processing to the application 1, thus appropriately controlling an access to the camera functions from a plurality of applications.

That is the detailed description of some embodiments of the present invention with reference to the accompanying drawings. The specific configuration is not limited to the embodiments as stated above, and the embodiments can be variously changed in design or the like without departing from the scope of the invention.

The above embodiments describe the application 2 that is an application to adjust image quality so as to enhance the image quality of the imaging data and outputs image-quality setting parameters related to image-quality adjustment. The present invention is not limited to this example. For instance, the application 2 may perform image processing such as background processing (e.g., blurring the background) of imaging data and correction of imaging data for beautiful skin, and may output setting parameters related to background processing and correction for beautiful skin. When imaging data is supplied to the application 1, the extension driver 120 may acquire setting parameters related to background processing and correction for beautiful skin from the application 2 via the registry 140. In this case, the image processor 123 of the extension driver 120 performs background processing or correction for beautiful skin on the imaging data based on the setting parameters for background processing or skin correction.

The application 2 may also output the setting parameters related to the imaging conditions of the camera 16. The imaging conditions include exposure, shutter speed, sensitivity, and frame rate. When the imaging data is supplied to the application 1, the extension driver 120 may acquire setting parameters for the imaging conditions of the camera 16 from the application 2 via the registry 140 and pass them to the camera 16.

This allows the information processing apparatus 10 to, when the application 1 is using the functions of the camera 16 to capture images, pass the setting parameters related to the imaging conditions of the camera 16 from the application 2 other than the application 1 to change the imaging conditions of the camera 16. In this way, the information processing apparatus 10 appropriately controls an access to the camera functions from multiple applications.

The above-stated information processing apparatus 10 internally includes a computer system. A program to implement the functions of various configurations of the information processing apparatus 10 as stated above may be stored in a computer-readable recording medium, and the processing at the various configurations of the information processing apparatus 10 may be performed by causing the computer system to read and execute the program stored in this recording medium. "Causing the computer system to read and execute the program stored in the recording medium" includes installing of such a program in the computer system. The "computer system" here includes an OS and hardware, such as peripherals. The "computer system" may include a plurality of computers connected via a network, including the internet and communication lines, such as WAN, LAN and dedicated lines. The "computer readable recording medium" is a portable medium, such as flexible disk, a magneto-optical disc, a ROM, or a CD-ROM, as well as a memory internally stored in the computer system, such as hard disk. In this way, the recording medium to store the program may be a non-transient recording medium, such as a CD-ROM.

The recording medium also includes an internal or external recording medium where a distribution server can access to distribute the program. The program may be divided into a plurality of pieces. After these pieces of program may be downloaded at different timings, they may be combined by the configurations of the information processing apparatus 10. Different distribution servers may distribute these divided pieces of program. The "computer readable recording medium" also includes the one that can hold a program for a certain period of time, as in a server that receives a program transmitted via a network or a volatile memory (RAM) in the computer system as the client. The program may implement a part of the functions as stated above. The program may be a differential file (differential program) that can implement the above functions by combining it with a program which is already stored in the computer system.

A part or all of the functions that the information processing apparatus 10 of the above-described embodiments has may be implemented as an integrated circuit, such as a large scale integration (LSI). Each of the functions as stated above may be implemented as one processor, or a part or all of the functions may be implemented as one processor in an integrated manner. A technique for integrated circuit is not limited to a LSI, and an integrated circuit may be realized using a dedicated circuit or a general-purpose processor. If a technique for integrated circuit that replaces LSIs becomes available with the development of semiconductor techniques, an integrated circuit based on such a technique may be used.

The above embodiments describe the example of the information processing apparatus 10 that is a laptop PC. In another embodiment, the information processing apparatus 10 may be a desktop type or tablet type PC. The camera 16 is not limited to that built in the information processing apparatus 10, which may also be an external device connected via universal serial bus (USB) or other means.

DESCRIPTION OF SYMBOLS

10 information processing apparatus
11 first chassis
12 second chassis
13 hinge mechanism
15 display unit
16 camera
17 communication unit
18 memory unit
19 input unit
20 EC
21 power supply unit
22 battery
100 system processing unit
101 CPU
102 GPU
103 memory controller
104 I/O controller
105 system memory
110 driver
120 extension driver
130 registry setting service
140 registry
121 buffer memory
122 setting unit
123 image processor

What is claimed is:

1. An information processing apparatus comprising:
a memory that temporarily stores a program of operating system (OS); and
a processor that
supplies imaging data captured by an imaging unit based on the program of OS to only one of applications running on the OS, and
performs image processing on the imaging data based on an image processing program running on the OS, wherein
the processor is configured to, when the imaging data is supplied to a first application, pass setting parameters used for the image processing program from a second application other than the first application to the image processing program via a registry of the OS.

2. The information processing apparatus according to claim 1, wherein the processor is configured to, when the imaging data is supplied to the second application, pass the setting parameters from the second application to the image processing program not via the registry.

3. The information processing apparatus according to claim 1, wherein the processor is configured to set the setting parameters output from the second application to the registry via a service, which changes settings of the registry, and then read the setting parameters set in the registry to pass the setting parameters to the image processing program.

4. The information processing apparatus according to claim 1, wherein the setting parameters are to adjust image quality of the imaging data.

5. The information processing apparatus according to claim 1, wherein the processor is configured to, when the imaging data is supplied to the first application, pass setting parameters related to imaging conditions for the imaging unit from the second application to the imaging unit via the registry.

6. A control method for an information processing apparatus including: a memory that temporarily stores a program of operating system (OS); and a processor supplies imaging data captured by an imaging unit based on the program of OS to only one of applications running on the OS, and performs image processing on the imaging data based on an image processing program running on the OS, the method comprising:
a step where the processor passes setting parameters used for the image processing program from a second application other than a first application to the image processing program via a registry of the OS;
a step where the processor performs image processing on the imaging data based on the setting parameters; and
a step where the processor supplies imaging data subjected to the imaging processing based on the setting parameters to the first application.

* * * * *